(12) United States Patent
Mooney et al.

(10) Patent No.: US 7,177,288 B2
(45) Date of Patent: Feb. 13, 2007

(54) SIMULTANEOUS TRANSMISSION AND RECEPTION OF SIGNALS IN DIFFERENT FREQUENCY BANDS OVER A BUS LINE

(75) Inventors: Stephen R. Mooney, Beaverton, OR (US); Aaron K. Martin, Hillsboro, OR (US); Matthew B. Haycock, Beaverton, OR (US); Bryan K. Casper, Hillsboro, OR (US); Shekhar Y. Borkar, Beaverton, OR (US); Joseph T. Kennedy, Beaverton, OR (US); James E. Jaussi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 866 days.

(21) Appl. No.: 09/998,008

(22) Filed: Nov. 28, 2001

(65) Prior Publication Data

US 2003/0101306 A1 May 29, 2003

(51) Int. Cl.
*H04L 5/14* (2006.01)
(52) U.S. Cl. .................. 370/295; 375/376; 326/30
(58) Field of Classification Search ............... 370/295, 370/485, 488, 489, 449, 451
See application file for complete search history.

(56) References Cited

U.S. PATENT DOCUMENTS

| | | | |
|---|---|---|---|
| 4,262,171 A * | 4/1981 | Schneider et al. .......... 370/295 |
| 4,885,587 A | 12/1989 | Wiegand et al. |
| 5,136,575 A * | 8/1992 | Kuroda ..................... 348/14.01 |
| 5,604,450 A | 2/1997 | Borkar et al. |
| 6,141,351 A * | 10/2000 | Goodnow et al. .......... 370/449 |
| 6,185,149 B1 | 2/2001 | Fujioka et al. |

(Continued)

OTHER PUBLICATIONS

Crisp, Richard, et al., "Development of Single-Chip Multi-GB/s DRAMs", 1997 IEEE International Solid-State Circuits Conference (ISSCC), pp. 226-227 & 461 (Feb. 6-8, 1997).

(Continued)

*Primary Examiner*—Chau Nguyen
*Assistant Examiner*—Jordan Hamann
(74) *Attorney, Agent, or Firm*—Matthew C. Fagan

(57) ABSTRACT

A device includes a bus, a first transmitter connected to the bus and configured to transmit a first signal over the bus in a first frequency band, a second transmitter connected to the bus and configured to transmit a second signal over the bus in a second frequency band at the same time that the first transmitter is transmitting the first signal, a first receiver connected to the bus and configured to receive the first signal transmitted over the bus in the first frequency band, and a second receiver connected to the bus and configured to receive the second signal transmitted over the bus in the second frequency band. The first frequency band and the second frequency band occupy different portions of the frequency spectrum.

33 Claims, 5 Drawing Sheets

U.S. PATENT DOCUMENTS

| | | |
|---|---|---|
| 6,348,811 B1 | 2/2002 | Haycock et al. |
| 6,373,289 B1 | 4/2002 | Martin et al. |
| 6,437,601 B1 | 8/2002 | Borkar et al. |
| 6,453,422 B1 | 9/2002 | Dabral et al. |
| 6,529,037 B1 | 3/2003 | Haycock et al. |
| 6,530,006 B1 | 3/2003 | Dodd et al. |
| 6,556,505 B1 | 4/2003 | Tojima et al. |
| 6,594,769 B2 | 7/2003 | Dabral et al. |
| 6,597,198 B2 | 7/2003 | Haycock et al. |
| 6,621,323 B1 | 9/2003 | Casper et al. |
| 6,639,426 B2 | 10/2003 | Haycock et al. |
| 6,747,474 B2 | 6/2004 | Borkar et al. |
| 6,791,356 B2 | 9/2004 | Haycock et al. |
| 6,803,790 B2 | 10/2004 | Haycock et al. |
| 6,845,424 B2 | 1/2005 | Casper et al. |
| 6,847,617 B2 | 1/2005 | Borkar et al. |
| 7,003,043 B2 | 2/2006 | Casper et al. |
| 2002/0095622 A1 | 7/2002 | Haycock et al. |
| 2003/0059036 A1 | 3/2003 | Casper et al. |
| 2004/0120405 A1 | 6/2004 | Jaussi et al. |
| 2006/0110952 A1 | 5/2006 | Borkar et al. |

OTHER PUBLICATIONS

Haycock, Matthew, et al., "A 2.5 Gb/s Bidirectional Signaling Technology", Hot Interconnects V Symposium Record, pp. 149-156 (Aug. 21-23, 1997).

Haycock, Matthew, et al., "3.2 GHz 6.4 Gb/s per Wire Signaling in 0.18 um CMOS", 2001 IEEE International Solid-State Circuits Conference (ISSCC), pp. 62-63 & 430 (Feb. 5-7, 2001).

Mooney, Randy, et al. "A 900 Mb/s Bidirectional Signaling Scheme", IEEE Journal of Solid-State Circuits, vol. 30, No. 12, pp. 1538-1543 (Dec. 1995).

Mooney, Randy, et al. "A 900 Mb/s Bidirectional Signaling Scheme", 1995 IEEE International Solid-State Circuits Conference (ISSCC), pp. 38-39 & 337 (Feb. 15-17, 1995).

Wilson, Howard, et al., "A Six-Port 30-GB/s Nonblocking Router Component Using Point-to-Point Simultaneous Bidirectional Signaling for High-Bandwidth Interconnects", IEEE Journal of Solid-State Circuits, vol. 36, No. 12, pp. 1954-1963 (Dec. 2001).

* cited by examiner

SIMULTANEOUS TRANSMISSION AND RECEPTION OF SIGNALS IN DIFFERENT FREQUENCY BANDS OVER A BUS LINE

TECHNICAL FIELD

This invention relates to data transmission along a simultaneous bi-directional bus.

BACKGROUND

Busses are used to transmit data between various components in a computer or other device. For example, busses may be used to transmit data between a central processing unit, chipsets, memory, and peripheral components. Data transmission along busses occurs over discrete periods of time that are allocated for use by the components connected to the bus.

Typically, a pin is associated with each data line of a bus. Thus, as the width of busses increases, the number of pins needed by a component to be connected to a bus increases. Large numbers of pins hinder miniaturization of the components connected to the bus. Moreover, as the number of components connected to a bus increases, the timing and allocation of transmissions along the bus becomes increasingly complex and may ultimately slow down the operational speed of the device.

DESCRIPTION OF DRAWINGS

Like reference symbols in the drawings indicate like elements.

DETAILED DESCRIPTION

Figure 1:
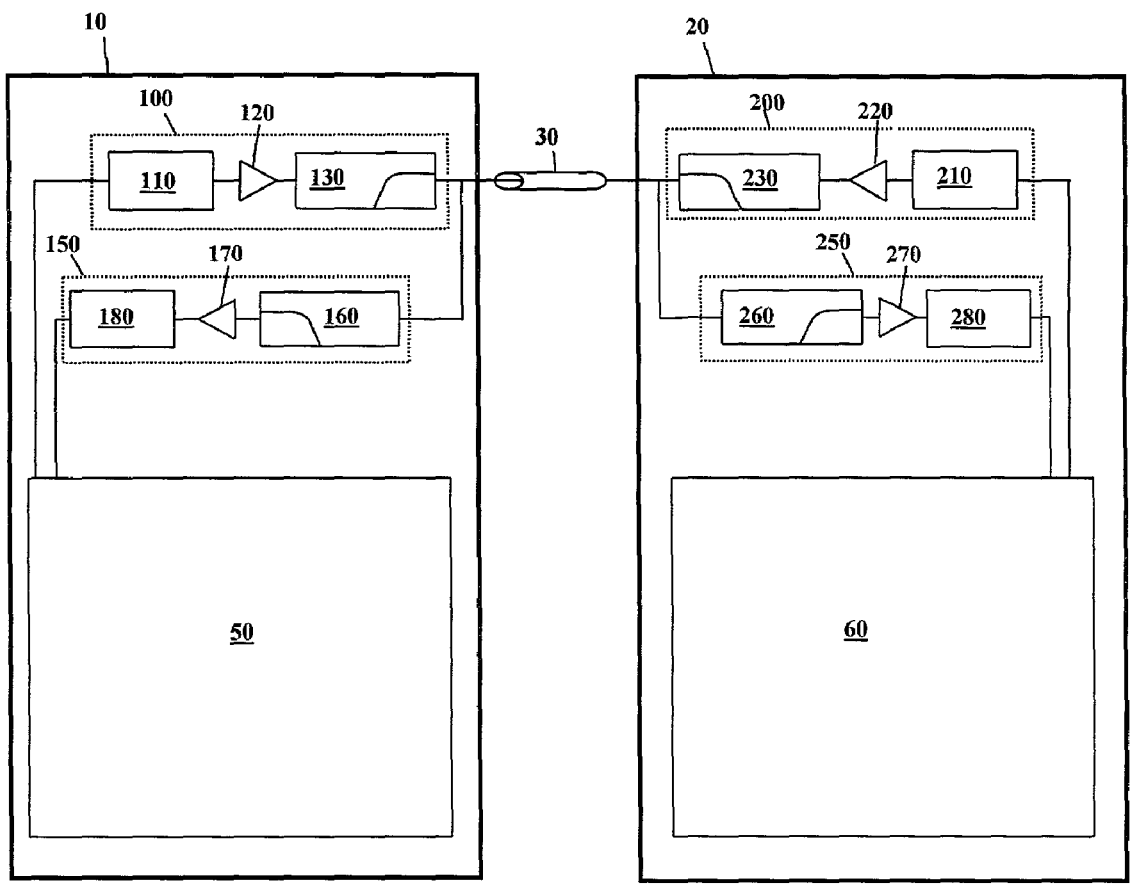
FIG. 1 is a block diagram of a simultaneous bi-directional bus and a pair of devices communicating along the bus.

Referring to FIG. 1, a first device 10 and a second device 20 communicate along a simultaneous bi-directional bus 30. Simultaneous bi-directional bus 30 carries a frequency division multiplexed signal between devices 10 and 20, which allows devices 10 and 20 to communicate simultaneously along a single conductor.

Devices 10 and 20 include, respectively, functional portions 50 and 60, which may be, for example, processors, memory storage units, control units, logic units, computational units, communication units, or other known units. Thus a functional portion 50 or 60 may be, for example, a microprocessor, chipsets (for example memory controllers, graphics controllers, and I/O controllers), a memory device, or an encoder or decoder for further data communication with a peripheral device. The devices 10 and 20 may each correspond to a single chip.

Functional portions 50 and 60 communicate over simultaneous bi-directional bus 30 using a transmitter 100 and receiver 150 of device 10, and a transmitter 200 and a receiver 250 of device 20. Transmitter 100 includes a high pass encoder 110, a buffering transmitter 120, and a high pass filter 130 in series, while transmitter 200 includes a low pass encoder 210, a buffering transmitter 220, and a low pass filter 230 in series. Receiver 150 includes a low pass filter 160, a buffering receiver 170, and a low pass decoder 180 in series, while receiver 250 includes a high pass filter 260, a buffering receiver 270, and a high pass decoder 280 in series.

The cutoff frequencies and encoding procedures of transmitters 100, 200 and receivers 150, 250 are selected so that data from transmitter 100 is decoded at receiver 250 and data from transmitter 200 is decoded at receiver 150. For example, high pass encoder 110 uses combinational logic to encode outbound messages from functional portion 50 to produce high frequency encoded message signals. To do this, high pass encoder 110 encodes outbound messages with a maximum run length and symbol shapes with selected spectral content in order to minimize the low frequency content of the high frequency encoded message signals. As used herein, run length represents the number of consecutive symbols with the same value.

The encoded message signals are augmented by transmitter 120, which may be implemented as, for example, a CMOS current mode transmitter or a voltage mode transmitter. GaAs- and SiGe-based transmitters may also be used. High pass filter 130 filters off any spurious harmonics or low frequency noise in the high frequency encoded message signals to ensure that the encoded message signals do not interfere with data transmission between transmitter 200 and receiver 150.

The high frequency encoded message signals from transmitter 100 are received by low pass filter 160 and high pass filter 260. Low pass filter 160 filters out the high frequency encoded message signals to prevent propagation into receiver 150. By contrast, high pass filter 260 passes the high frequency encoded message signals to buffering receiver 270, which boosts them and passes them along for decoding by high pass decoder 280. High pass decoder 280 uses complementary combinational logic to decode the high frequency encoded message signals into inbound messages for receipt by functional portion 60.

Communications from functional portion 60 to functional portion 50 are transmitted simultaneously along the same bi-directional bus 30 at low frequencies. Low pass encoder 210 uses combinational logic to encode outbound messages from functional portion 60 to produce low frequency encoded message signals. The encoded message signals are augmented by transmitter 220, which may be implemented as a CMOS current mode transmitter or a voltage mode transmitter. GaAs- and SiGe-based transmitters may also be used. Low pass filter 230 removes any spurious harmonics or high frequency noise in the low frequency encoded message signals to ensure that the low frequency encoded message signals do not interfere with data transmission between transmitter 100 and receiver 250.

The low frequency encoded message signals from transmitter 200 are received by low pass filter 160 and high pass filter 260. High pass filter 260 filters out the low frequency encoded message signals to prevent propagation into receiver 250. By contrast, low pass filter 160 passes the low frequency encoded message signals to buffering receiver 170, which boosts them and passes them along for decoding by low pass decoder 180. Low pass decoder 180 uses complementary combinational logic to decode the low frequency encoded message signals into inbound messages for receipt by functional portion 50.

Figure 2:
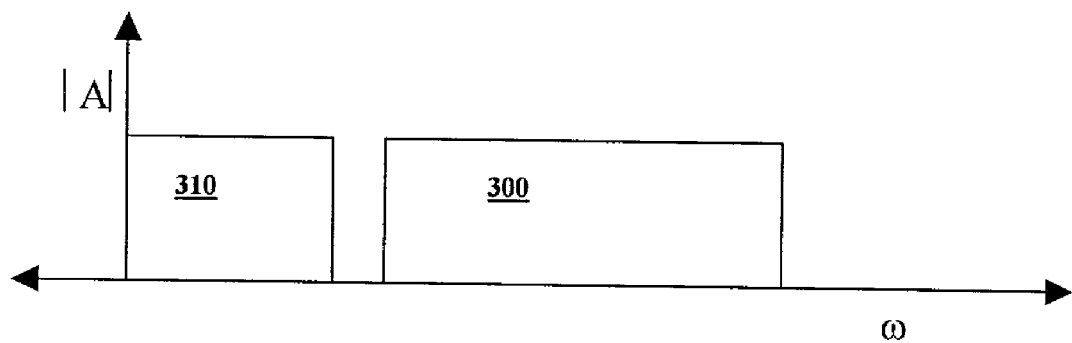
FIG. 2 is a graph of an exemplary frequency division on a simultaneous bi-directional bus.

An exemplary division of the frequency spectrum on bi-directional bus 30 is illustrated in FIG. 2. The spectral content of high frequency encoded message signals is within band 300, while the spectral content of low frequency encoded message signals is within band 310. Since bands 300 and 310 occupy different portions of the frequency spectrum, simultaneous data transmission along a single line can occur.

In FIG. 2, the bandwidth of band 300 is larger than that of band 310. This asymmetry is not necessary although it is advantageous when the majority of communication along bus 30 is in one direction. For example, a non-volatile memory may transmit significantly more data to a processor than it receives from the processor. In this case, band 300 is dedicated to transmissions from the non-volatile memory, and band 310 is dedicated to transmissions from the processor.

Figure 3:
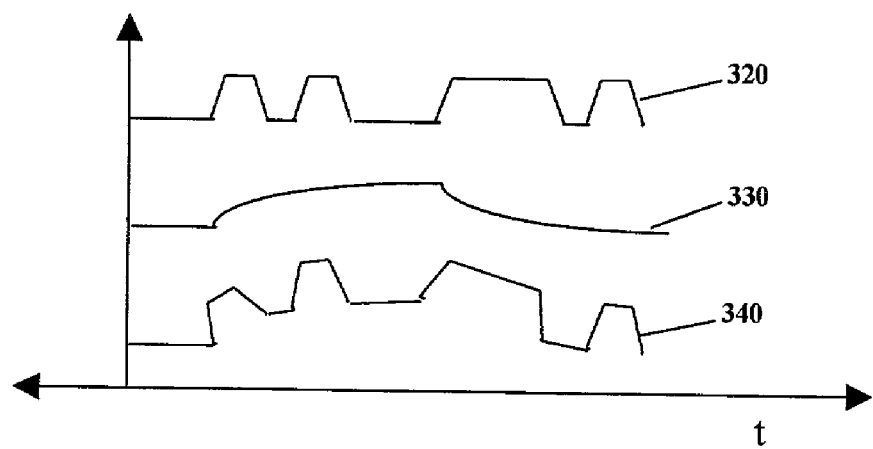
FIG. 3 is a graph of an exemplary output signals and the combined signal on a simultaneous bi-directional bus.

Exemplary time traces of a high frequency encoded message signal 320, a low frequency encoded message signal 330, and a combined signal 340 are illustrated in FIG. 3. Combined signal 340 is the signal on bi-directional bus 30 and results from the superposition of signals 320 and 330. High frequency filter 260 passes frequency encoded message signal 320 and low frequency filter 160 passes low frequency encoded message signal 330. Message signals 320, 330 can be, for example, control data, memory request data, read data, or write data.

High frequency encoded message signal 320 has a trapezoidal symbol shape and low frequency encoded message signal 330 has an exponential symbol shape. Other symbol shapes such as, for example, Gaussian, wavelet, and raised cosine pulse symbols may also be used.

Referring back to FIG. 1, in the illustrated implementation, the passbands and cutoff frequencies of filters 130, 160, 230, 260 and the combinational logic used by encoders 110, 210 are predetermined. In other words, devices 10 and 20 are manufactured to transmit and receive data in predetermined spectral windows along simultaneous bi-directional bus 30.

In some implementations, each device 10, 20 may include transmitters and receivers with the particular frequencies used by each device being selected or tuned on an activity-by-activity basis. Thus, for example, a processor may use the larger band 300 when writing to a volatile memory, while the volatile memory may use the larger band 300 when being read by the processor.

Figure 4:
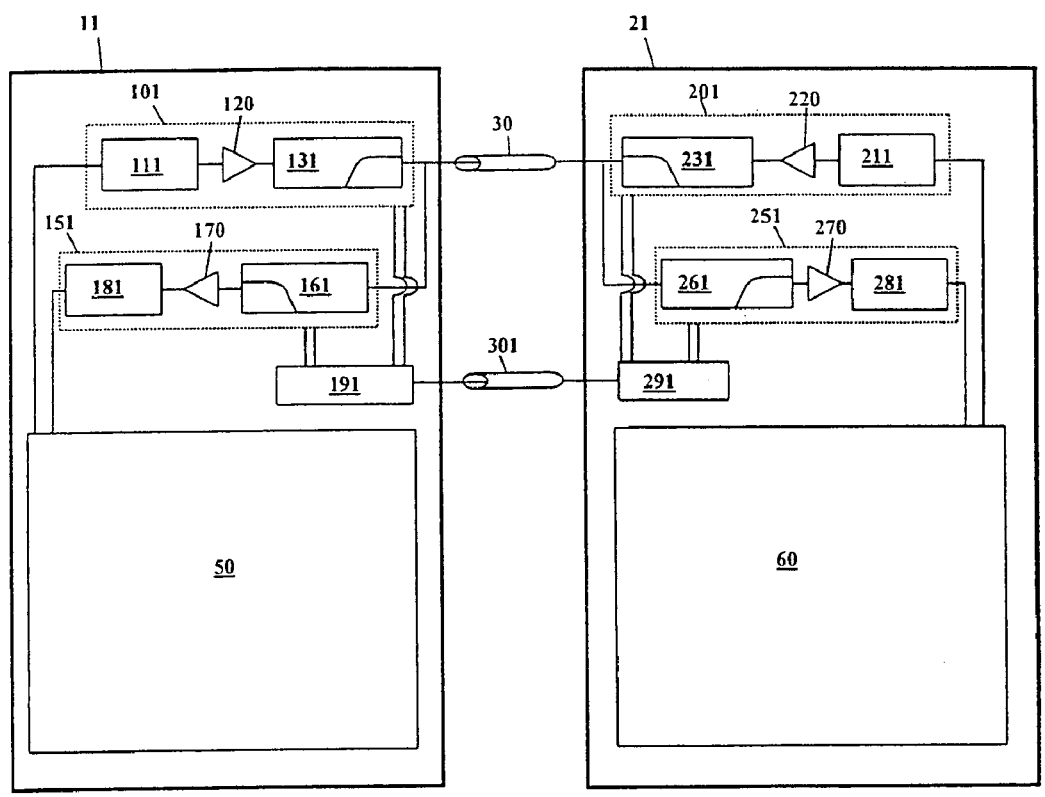
FIG. 4 is a block diagram of another simultaneous bi-directional bus and a pair of devices communicating along the bus.

For example, in the implementation shown in FIG. 4, the passbands and cutoff frequencies of filters 131, 161, 231, 261 and the combinational logic used by encoders 111, 211 are arbitrated between devices 11 and 21. Devices 11 and 21 each include a respective arbitration portion 191, 291 that arbitrates over an arbitration bus 301 connecting devices 11 and 21. Arbitration portions 191, 291 set the transmission and reception characteristics of the respective transmitters 101, 201 and receivers 151, 251. To this end, filters 131, 161, 231, and 261 are programmable and encoders 111, 181, 211, and 281 have combinational logic tables that include inputs originating from arbitration portions 191, 291, or otherwise respond to signals from arbitration portions 191, 291.

Figure 5:
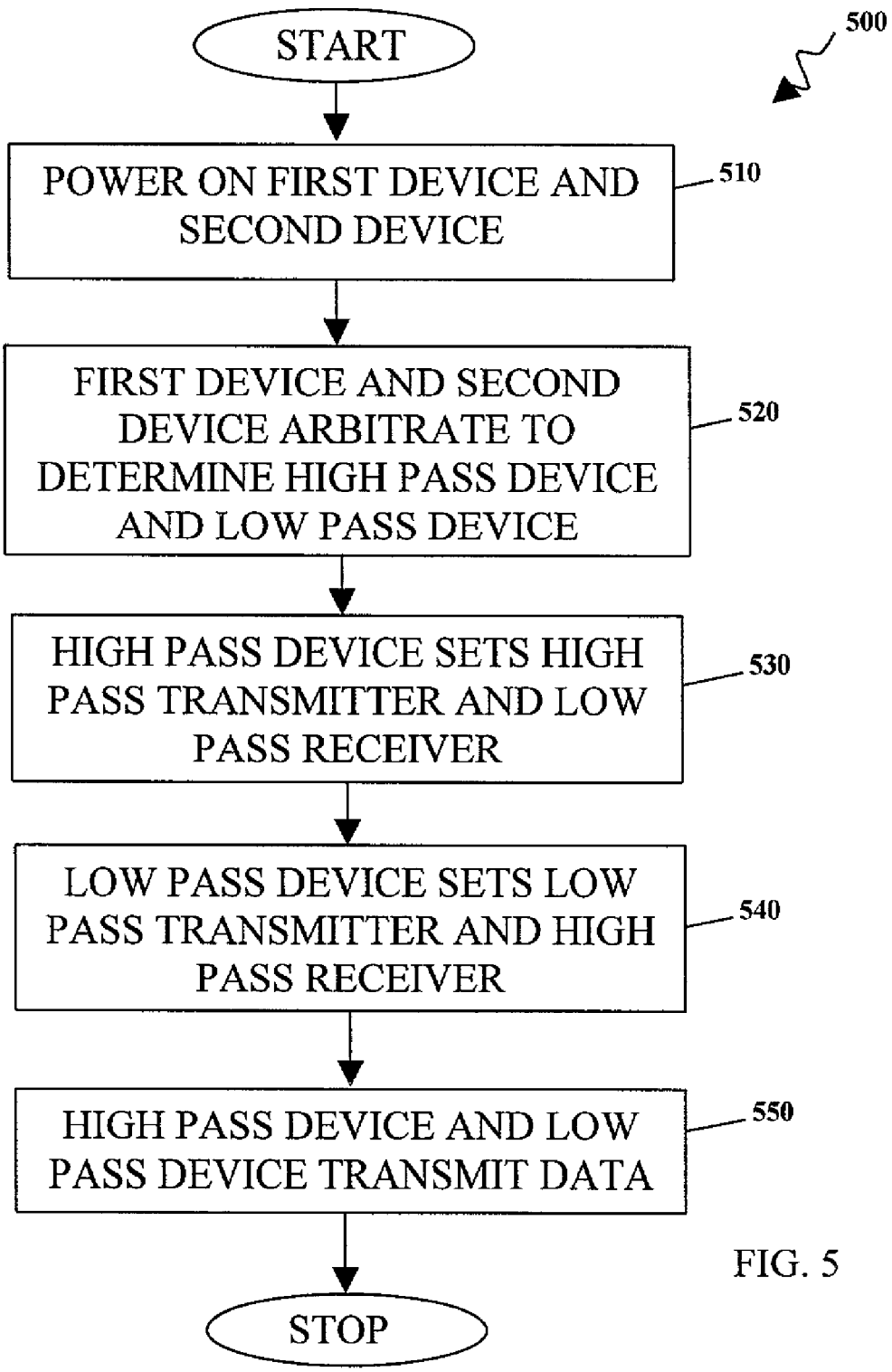
FIG. 5 is an exemplary process flow for arbitrating between two devices on a simultaneous bi-directional bus.

FIG. 5 illustrates a process flow 500 for arbitrating between two devices. Initially, the first and second devices are powered on (step 510). Powering on triggers an arbitration process in which the first and second devices arbitrate to identify which will act as a high pass device and which will act as a low pass device. Determining a high pass device and a low pass device includes, for example, adapting bandwidths to the anticipated need for data transmission between functional portions 50 and 60, establishing encoding protocols, and determining cutoff frequencies for the selected bandwidths (step 520). Next the identified high pass device sets a high pass transmitter and a low pass receiver (step 530), and the identified low pass device sets a low pass transmitter and a high pass receiver (step 540). Setting high and low pass transmitters and receivers includes setting the hardware components of the transmitters and receivers to function with the arbitrated characteristics. Finally, the high pass device and low pass device transmit data along a simultaneous bi-directional bus (step 550).

The arbitration of process flow 500 is performed after each system power up. Arbitration can be performed more or less frequently. For example, the results of a single arbitration can be stored in a non-volatile memory and revisited after power up, or arbitration can be performed on a periodic basis to ensure rate adaptation, i.e., to accommodate changes in the type of communication along a simultaneous bi-directional bus.

Figure 6:
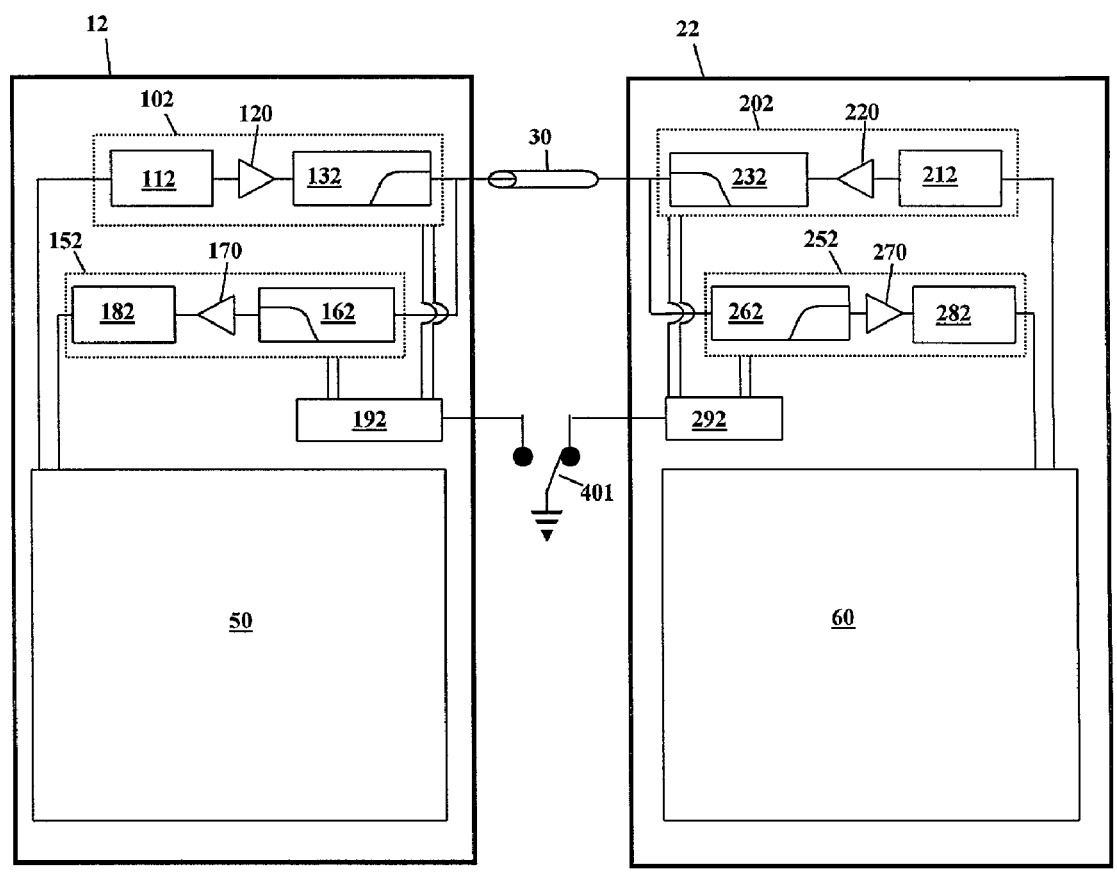
FIG. 6 is a block diagram of another simultaneous bi-directional bus and a pair of devices communicating along the bus.

Referring to FIG. 6, in another implementation, the passbands and cutoff frequencies of filters 132, 162, 232, 262 and the format of the combinational logic used by encoders 112, 212 are selected by the user. Devices 12 and 22 each include a respective selection portion 192, 292 that relies upon a user's selection made at a selection device 401 to set the transmission and reception characteristics of the respective transmitters 102, 202 and receivers 152, 252. Filters 132, 162, 232, 262 are programmable and encoders 112, 212, 182, 282 have combinational logic tables that include inputs originating from selection portions 192, 292, or otherwise respond to signals from selection portions 192, 292.

Selection device 401 is illustrated as a single-pole double-throw switch. Naturally, other selection devices are within the level of ordinary skill in the art, including, for example, fuses, jumpers, DIP switches, and software-based selection devices.

A number of implementations have been described. Nevertheless, it will be understood that various modifications may be made. For example, bi-directional bus 30 need not carry all communications between devices 10 and 20. For example, bi-directional bus 30 can include data lines but not control lines. Also, more than two devices can be connected to the bi-directional bus 30, and the devices can arbitrate for use of high and low frequency bands. In some implementations, more than two bands may be used.

Accordingly, other implementations are within the scope of the following claims.

What is claimed is:

1. A system comprising:
   a bus having a plurality of lines;
   a first device having a first transmitter to transmit first signals in a first frequency band over one line of the plurality of lines and having a receiver to receive second signals in a second frequency band over the one line while first signals are transmitted over the one line, wherein the first transmitter includes an encoder to define at least in part the first frequency band; and
   a second device to communicate with the first device over the plurality of lines, the second device having a second transmitter to transmit second signals in the second frequency band over the one line,
   wherein the first frequency band and the second frequency band occupy different portions of a frequency spectrum.

2. The system of claim 1 wherein the first transmitter includes a filter having a cutoff frequency to define at least in part the first frequency band.

3. The system of claim 1 wherein the encoder has a defined run length.

4. The system of claim 1 wherein the encoder is to use a combinational logic table.

5. The system of claim 1 wherein the first frequency band and the second frequency band are fixed.

6. The system of claim 1 wherein the first transmitter and the receiver are associated with a microprocessor.

7. The system of claim 1 wherein the first transmitter and the receiver are associated with a memory storage device.

8. The system of claim 1 wherein the first transmitter and the receiver are associated with a chipset.

9. The system of claim 1 wherein:
the first transmitter includes a first output connected to the one line;
the second transmitter includes a second output connected to the one line; and
the receiver includes an input connected to the one line.

10. The system of claim 1 wherein the second device has a receiver to receive first signals over the one line while second signals are transmitted over the one line.

11. The system of claim 1, wherein the first device has a processor and the second device has volatile memory.

12. A system comprising:
a bus having a plurality of lines;
a first device having a first transmitter to transmit first signals in a first frequency band over one line of the plurality of lines and having a receiver to receive second signals in a second frequency band over the one line while first signals are transmitted over the one line, wherein the first transmitter and the receiver are part of a single chip; and
a second device to communicate with the first device over the plurality of lines, the second device having a second transmitter to transmit second signals in the second frequency band over the one line,
wherein the first frequency band and the second frequency band occupy different portions of a frequency spectrum.

13. A system comprising:
a bus having a plurality of lines;
a first device having a first transmitter to transmit first signals in a first frequency band over one line of the plurality of lines and having a receiver to receive second signals in a second frequency band over the one line while first signals are transmitted over the one line;
a second device to communicate with the first device over the plurality of lines, the second device having a second transmitter to transmit second signals in the second frequency band over the one line; and
a band setting unit to set the first frequency band and the second frequency band in response to an input signal,
wherein the first frequency band and the second frequency band occupy different portions of a frequency spectrum.

14. The system of claim 13 comprising a user selection device to generate the input signal.

15. The system of claim 13 comprising a first arbitration module and a second arbitration module to arbitrate between one another to generate the input signal.

16. A device comprising:
a transmitter to transmit first signals in a first frequency band over one of a plurality of lines of a bus over which the device is to communicate with another device, wherein the transmitter includes an encoder to define at least in part the first frequency band;
a receiver to receive second signals in a second frequency band over the one line while first signals are transmitted over the one line,
wherein the first frequency band and the second frequency band occupy different portions of a frequency spectrum; and
a functional portion to transmit signals using the transmitter and to receive signals using the receiver.

17. The device of claim 16 wherein the transmitter includes a filter having a cutoff frequency to define at least in part the first frequency band.

18. The device of claim 16 wherein the first frequency band and the second frequency band are fixed.

19. The device of claim 16, wherein the functional portion is a processor.

20. The device of claim 16, wherein the functional portion is memory.

21. The device of claim 16, wherein the functional portion is a controller for a chipset.

22. The device of claim 16, wherein the encoder has a defined run length.

23. The device of claim 16, wherein the encoder is to use a combinational logic table.

24. A method comprising:
transmitting by a first device first signals in a first frequency band over one of a plurality of lines of a bus over which the first device is to communicate with a second device,
wherein transmitting first signals includes encoding an output to form a first signal in the first frequency band; and
receiving by the first device second signals in a second frequency band over the one line while first signals are transmitted over the one line,
wherein the first frequency band and the second frequency band occupy different portions of a frequency spectrum.

25. The method of claim 24 wherein transmitting first signals includes encoding an output to form a first signal with a defined run length.

26. The method of claim 24 wherein the second device comprises memory and wherein the method comprises:
transmitting a first signal to request data from the memory; and
receiving a second signal to receive requested data from the memory.

27. A method comprising:
transmitting by a first device first signals in a first frequency band over one of a plurality of lines of a bus over which the first device is to communicate with a second device,
receiving by the first device second signals in a second frequency band over the one line while first signals are transmitted over the one line; and
setting the first frequency band and the second frequency band in response to an input signal,
wherein the first frequency band and the second frequency band occupy different portions of a frequency spectrum.

28. The method of claim 27 wherein the setting comprises arbitrating between the first and second devices.

29. The method of claim 27 wherein the setting comprises setting the first frequency band by a user.

30. A device comprising:
a transmitter to transmit first signals in a first frequency band over one of a plurality of lines of a bus over which the device is to communicate with another device;

a receiver to receive second signals in a second frequency band over the one line while first signals are transmitted over the one line, wherein the first frequency band and the second frequency band occupy different portions of a frequency spectrum; and a functional portion to transmit signals using the transmitter and to receive signals using the receiver, wherein the transmitter, receiver, and functional portion are part of a single chip.

31. The device of claim 30, wherein the transmitter includes an encoder to define at least in part the first frequency band.

32. A device comprising;

a transmitter to transmit first signals in a first frequency band over one of a plurality of lines of a bus over which the device is to communicate with another device;

an arbitration module to set the first frequency band;

a receiver to receive second signals in a second frequency band over the one line while first signals are transmitted over the one line, wherein the first frequency band and the second frequency band occupy different portions of a frequency spectrum; and a functional portion to transmit signals using the transmitter and to receive signals using the receiver.

33. The device of claim 32, wherein the transmitter includes an encoder to define at least in part the first frequency band.

* * * * *